Aug. 30, 1966 J. B. TOMLIN 3,269,699
GATE VALVE SEAT SKIRT
Filed Dec. 2, 1963
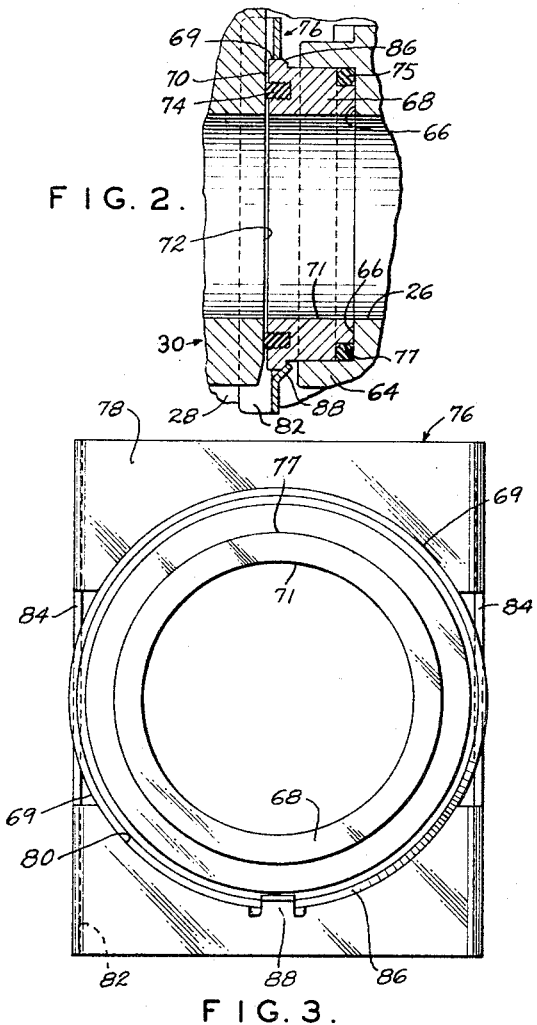
FIG. 2.
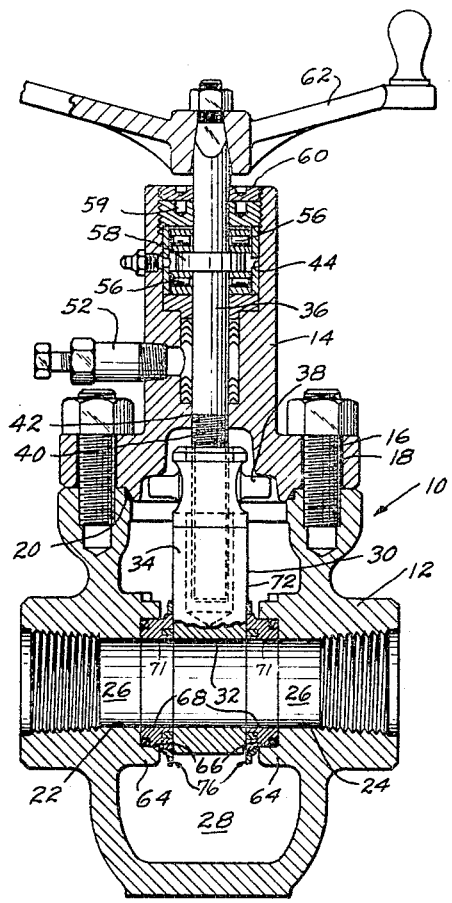
FIG. 1.
FIG. 3.
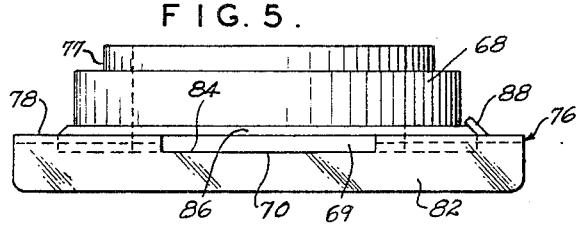
FIG. 5. FIG. 4.
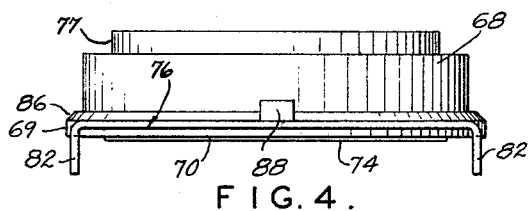
INVENTOR.
JERRY B. TOMLIN
BY
AGENT United States Patent Office 3,269,699
Patented August 30, 1966

3,269,699
GATE VALVE SEAT SKIRT
Jerry B. Tomlin, Houston, Tex., assignor to ACF Industries, Incorporated, New York, N.Y., a corporation of New Jersey
Filed Dec. 2, 1963, Ser. No. 327,354
7 Claims. (Cl. 251—327)

This invention relates generally to valves, and more particularly to a through conduit type gate valve, having a reciprocating gate member and annular seat members, which are maintained in alignment with a through passage in the valve.

Gate valves, particularly through conduit gate valves, which when opened present an unbroken smooth wall conduit for uninterrupted passage of flow therethrough, are widely used because of their desirable flow characteristics. When in the open position, the straight through passage, which is provided by a through conduit type gate valve, offers no more appreciable resistance to fluid flow than an equal length of equal diameter pipe. Although good flow characteristics are important, an even more important aspect of any valve is its ability to seal. While in certain installations it is only necessary for a valve to stop flow from passing out of the downstream side, there are other installations where it is necessary that the valve also stops flow on the upstream side, thereby resulting in a stronger and more reliable valving system. An upstream seal is also necessary for block and bleed service, i.e., service where pressure is bled from the valve chamber with the upstream and downstream seats in sealing contact with the gate to indicate leakage past either seat.

In order to provide both an upstream and downstream seal when employing a gate type sealing element, either movement of the seat members into sealing contact with the gate, or movement of the gate into sealing contact with the seats must occur. Where movable seats are employed, generally a slab type gate is engaged by the seats upon movement thereof in response to line pressure. This type of sealing arrangement is known in the industry as "pressure actuated seats." Another sealing arrangement is known in the industry as an "expanding gate" and is generally employed with stationary seats. An "expanding gate" may be formed of two or more parts allowing lateral expansion of the sealing surfaces of the gate into sealing contact with stationary seat members.

Whether movement of the gate into sealing contact with the seat members, or movement of the seat members into sealing engagement with the gate occurs, a problem of maintaining lateral alignment of the gate with the through passage of the valve occurs. Lateral misalignment of the through passage of the gate and the flow passage of the valve body causes a slight constriction in the flow passage through the valve which reduces the flow capability of the valve. Lateral misalignment of the gate also results in a flow passage which is not smooth and causes extreme turbulence in the fluid flowing through the valve which reduces the flow capability of the valve as well as causing a high rate of wear on the working parts of the valve. A flow passage in a through conduit type valve also presents serious problems when the pipeline including the valve is "pigged" to clean the line. Occasionally objects called pigs, scrapers, balls, etc., are forced through the pipe line by the lading and serve to scrape material from the inside of the line or to otherwise rid the line of unwanted obstructions which reduce the flow capacity of the line. For example, in the handling of some types of crude oil, paraffin from the oil will adhere to the inside of the line and must be removed periodically by a line scraper. The line scraper is generally a cylindrical object slightly smaller than the inside diameter of the line and having a peripheral cutting edge for removing the paraffin. The cylindrical scraper must pass through any valves in the line obviously and, therefore, the through passage in the valve must be smooth to prevent the pig or scraper from becoming lodged in the valve and blocking the line.

While the gate is maintained in vertical and axial alignment by the valve stem and by the seat members, respectively, there must be means present in the valve chamber to prevent sidewise movement also so that there is no possibility of gate misalignment in any direction. Regardless of the pressure capability of the valve, which might reach 10,000 p.s.i., the force required to prevent sidewise misalignment of the gate member is slight, amounting to only a few ounces or at most a few pounds of force.

In the past, floating seat members for slab gate valves and seats for expanding gate valves have been manufactured from a single piece of stock by combining forging and milling operations to produce integral seat and gate guide members for disposition on either side of the gate. A pair of guide flanges are formed on each of the seat members which extend normal to the plane of the flat sealing surfaces of the gate and are positioned for engagement by the side surfaces of the gate to prevent sidewise movement of the gate. Integral gate guide and seat structure is clearly illustrated at 35 in the U.S. Patent No. 2,951,497 to Laurent. Since the force required to prevent sidewise movement of the gate member is quite small, the guide flanges of integral seat and guide structures were obviously much stronger and incorporated much more of the expensive metal alloy from which the seats must be made than was needed, thereby making the cost of this type of structure very high. Obviously the forging and/or milling operations employed to produce an integral seat and gate guide structure was very expensive, increasing the cost and thus the competitiveness of the end product.

To eliminate the high cost of the above described forging and milling operations involved in producing a combination seat member and guide member, separate seat members and guide members were produced. The seat members including one or more annular ring-like parts could be produced on a lathe or screw machine resulting in low manufacturing cost of the seat member itself. Face sealing and back face sealing surfaces of the annular seat members could be surface ground in groups utilizing a magnetic table for support, thus further reducing manufacturing cost.

A gate guide member was stamped from thin metal sheet material and formed with a circular opening allowing it to fit and be retained on the circular periphery of each of the seat members. Forming the guide member separately and by stamping instead of forming it integrally and milling the guide flanges thereon obviously reduced manufacturing costs of the valve and made the valve more competitive.

While the newly designed low cost gate guide member was reliable as far as accurate lateral positioning of the gate is concerned, it was found, upon disassembly of a number of valves in which sheet metal guide members were employed, that one or both of the guides had become dislodged from the seat members and had moved into the path of the gate member where it was contacted and crushed by the gate. The guide member, being formed of relatively light sheet stock, is readily crushed or otherwise mutilated by movement of the gate if allowed to be contacted by the gate upon opening or closing thereof.

Damage to the gate guide members may also occur when installing the seats, guides, and gate in the valve body. Due to the construction of a gate valve, the seats are inserted into the seat recesses; the guide members are positioned on the seats and the gate and bonnet are then installed. Since the valve is partially closed when installing the gate and bonnet, it is difficult to prevent or detect dislodgement of one or both of the guide members.

When the guide members become dislodged, a portion of the guide may move into the path of the gate and, in such a misaligned position, the guide may be contacted by the gate and crushed upon moving the gate to its open or closed position.

Although stamped gate guides are inexpensive in relation to the cost of the valve, the labor costs and production losses involved in their replacement are considerable. A damaged gate guide member may also cause gouging or scoring of the gate or seats resulting in costly replacement and repair and at times involving extremely high repair costs.

Frequently, to eliminate excessive down time on the line, a valve will be repaired in place, especially if the valve is welded into the line. In this type of "field" repair, the through conduit of the valve may be positioned vertically, and in a vertical position the upper guide member, since it is retained on the seat only due to the closeness of the fit between the guide and the seat, may easily become misaligned due to gravity during installation of the gate and bonnet. Since the valve is partially closed during installation of the gate and bonnet, faulty guide alignment cannot be visually detected until the valve is completely assembled and tested for proper opening and closing. The valve must be disassembled and the guide alignment corrected, causing excessive down time for repair of the valve. Excessive down time on the line caused by unwarranted valve damage of this nature obviously can cause extremely high production losses.

Misalignment of the guide member may also occur during normal operation of the valve even if the guides have been correctly installed. When the gate is in its uppermost position, the lower curved portion of the gate may contact the curved portion of the guide defined by the circular opening in the guide, if the lower portion of the guide should become dislodged from the seat due to vibration, seat movement, line pressure, etc. Downward movement of the gate with the guide in a misaligned position would obviously result in damage to the guide if not damage to the gate and seat members.

With the foregoing in mind, the present invention was conceived and developed to eliminate any possibility of guide misalignment either during installation or normal operation.

It is, therefore, an object of this invention to provide a gate valve incorporating novel separate seat and valve guide members, which will not become misaligned during installation or operation of the same.

A further object of this invention is to provide a novel through conduit gate valve having valve guide members which may be installed regardless of the position of the valve.

It is an object of this invention to provide a novel through conduit gate valve employing sealing members and gate guide members which prevent installation of the gate into the valve chamber unless the guide members are properly in place.

An object of this invention contemplates the provision of a novel through conduit gate valve having valve guide members which are inexpensive in manufacture and reliable in use.

Other and further objects of the invention will be obvious upon an understanding of the illustrative embodiments about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIGURE 1 is an elevational view in section illustrating a gate valve in accordance with this invention.

FIGURE 2 is a sectional view illustrating the valve seat and valve guide of FIGURE 1.

FIGURE 3 is a side elevational view illustrating the seat member and valve guide of FIGURE 1.

FIGURE 4 is a bottom view illustrating a seat member and valve guide member of FIGURE 1.

FIGURE 5 is an elevational view illustrating the valve seat and valve guide member of FIGURE 1 in accordance with this invention.

Briefly, the invention comprises a through conduit type gate valve incorporating novel guide members which prevent misalignment of the gate member and the through passages of the valve both during assembly of the valve and during normal valve operation.

Referring now to the drawing for a better understanding of the invention, a through conduit gate valve 10 is shown in FIGURE 1, which comprises a valve body assembly 12 and a bonnet assembly 14. The bonnet assembly is fixed to the upper portion of the valve body by a series of bolts 16, which are threaded into the body and which extend through openings 18 in the bonnet 14. An annular sealing member 20 is positioned between the body and bonnet to establish a fluid tight seal therebetween. The valve body 12 is provided with through ports 22 and 24, which define a bore 26 and which may be internally threaded, as illustrated in FIGURE 1, for threaded connection into a piping system. The valve may be connected to a piping system by welding, by flange connection, or any of the various well known methods of attachment without departing from the spirit or scope of this invention. A valve chamber 28 is formed within the valve body 12 and intersects the bore 26 for communication between the valve chamber and the bore. A gate member 30, which may be either a slab type gate as illustrated or an expanding type gate, is positioned within the valve chamber 28 and is reciprocable from a position where the bore 26 is fully open to a position fully closing the bore 26.

The gate member 30 consists of a substantially flat metal plate having a through passage 32 formed therein which is adapted to register with the bore 26 in the valve body 12 to provide a continuous flow path in the open position and a solid portion 34 which blocks the bore 26 in the closed position. The passage 32 in registering with the bore 26 forms an unbroken smooth walled conduit for the uninterrupted passage of flow therethrough, which offers no more appreciable resistance to flow than an equal length of equal diameter pipe. The upper portion of the gate member 30 is attached to means, such as the stem 36, for raising and lowering the gate. As illustrated in FIGURE 1, the gate may be provided with an internally threaded drive nut 38, which is retained by the upper portion of the gate and which coacts with threads 40 on the stem 36 to reciprocate the gate member upon rotation of the stem 36. The attachment between the stem and gate may be fixed or rigidly connected and vertical stem movement may be effected by a handwheel which threadedly receives the upper portion of the stem as illustrated in the Patent No. 3,054,595 to McKinny. Obviously, any one of the numerous well known manual or power operated means of achieving vertical stem reciprocation may be incorporated into this invention without departing from the spirit or scope hereof.

As mentioned above, the bonnet assembly 14 forms a closure for the valve chamber 28 and is provided with a bore 42 through which the stem 36 passes and a chamber 44 for retaining a packing and bearing assembly. Packing material, which may be plastic or other suitable similar solid materials, is retained in the chamber 44 and about the stem 36 by packing retainer bushings and serves to provide a fluid-tight seal between the stem 36 and the bonnet 14. A packing fitting assembly 52 is threadedly attached to the bonnet and is adapted to force the packing material into the chamber 44 surrounding the stem 36. Upper and lower thrust bearings 56 are positioned within the chamber 44 and about the stem 36 on either side of an enlarged diameter collar portion 58 of the stem 36, and serves to retain the stem against vertical movement and simultaneously to reduce the torque required to rotate the stem. The bearings 56 are prevented from excessive vertical movement by an adjustable bearing assembly retainer 59 and a lock nut 60. Rotational movement of the stem 36 is effected by rotating a handwheel 62, which is positioned at the upper extremity of the stem 36 or may be rotated by any one of numerous power valve operators.

The valve body member 12 is formed with internal bosses 64, which protrude into the valve chamber 28, and which are bored concentrically with the bore 26 to define aligned facing seat recesses 66. In each of the recesses 66 is positioned a seat member 68, having an internal diameter 69 of the same size as the diameter of the valve bore and which may be a single annular ring-like member, as illustrated in FIGURE 2, which is press-fitted within the recess. The seat ring may be formed of two or more annular ring-like portions and may be pressure actuated into sealing engagement with a slab type gate valve. Obviously many different seat constructions may be employed without changing the spirit and scope of this invention. The seat member need not be annular nor of single piece construction to be employed in conjunction with this invention. A face sealing surface 70 of the ring-like sealing member 68 may contact the sealing surface 72 of the gate or an annular sealing member 74 may be retained in an annular groove in the face sealing surface 70 for engagement with the sealing surface 72 of the valve gate 30. An annular back face sealing member 75 is positioned in an annular chamber defined by the recess 66 and a reduced diameter portion 77 of the seat. A gate guide member 76 formed of light sheet material such as sheet steel for example, is supported by each of the seat members, as illustrated in FIGURE 2, and serves to prevent lateral movement of the gate member in a direction normal to the bore 26. The gate guide member 76 comprises a generally planar body portion 78 formed with a generally circular opening 80. The diameter of the circular opening 80 is slightly larger than the diameter of the annular flange 69 on the seat member 68, so that a tight fit may be obtained between the guide member and the annular flange. Edge portions of the planar body are bent normal to the planar surface 78 and present parallel gate guide flange members 82. The parallel guide flanges 82 are spaced apart slightly greater distance than the thickness of the gate member and retain the gate member against lateral movement without any appreciable frictional contact with the gate member.

Therefore, to prevent the possibility of misalignment of the light sheet metal guide member from the valve seats, each of the guide members is adapted to be positively retained on the seat members as described below.

Each of the guide flanges 82 of the guide is formed with a generally rectangular cut-out portion defining flat surfaces 84 which are positioned below the lower surface of the planar body portion 78 as illustrated in FIGURE 5. The flat surfaces 84 of the guide member 76 engage the face sealing surface 70 of the seat member 68 to limit outward axial movement of the guide member relative to the seat member.

The annular flange 69 of the seat member 68 is provided with a beveled surface 86. The guide member 76 is provided with an angularly offset tab portion 88, which contacts the beveled surface 86 when the guide member is correctly positioned on the seat member and locks the lower portion of the guide member against axial inward movement toward the gate 30 and relative to the seat member 68. Therefore, the guide member 76 is prevented from axial outward movement by the flat surfaces 84 and axial movement of the lower portion of the guide member toward the gate 30 is prevented by the novel tab construction 88. Obviously, with the gate member in place, the upper portion of the guide member is prevented from axial inward movement by the valve member. Therefore, the guide member will be retained in position on the annular flange 69 of the seat member 68 at all times when the gate is in position.

When the gate 30 is not positioned between the seat members 68, such as during installation of the seats and valve guide members, the tab member 88 serves to retain the guides on the seats even if the flow passage of the valve is vertically positioned such as might occur when the valve is serviced in the line. The tab member 88 locks the lower portion of the guide member to the upper seat to prevent the guide from falling into the valve chamber and establishes a pivot about which the upper portion of the guide must rotate in order to fall clear of the annular flange 69. Locking the lower portion of the guide member to the seat member also results in a slight binding force being exerted between the upper portion of the valve guide member and the seat which prevents movement of the guide member toward the gate. Due to the closeness of the fit between the annular flange 69 and the guide 76, the upper portion of the guide member must be sprung or flexed to clear the outer shoulder defined by the intersection of the face sealing surface 70 and the circumferential surface defined by the outer periphery of the flange 86. Since considerable effort is required to cause springing or flexing of the guide member as described above, it is highly unlikely that the upper portion of the guide could become so dislodged. However, assuming that the upper portion of the guide member does become dislodged, it is obvious that the upper portion of the guide member would block even partial insertion of the gate and, therefore, the gate could not be inserted into its position. Therefore, when employing the invention, it is impossible to install the seats, guides, and the gate member unless the alignment of the gate guides is correct, and once correctly installed it is impossible for the guide members to become misaligned.

From the foregoing, it is seen that this invention is one well adapted to attain all of the objects hereinabove set forth, together with other advantages, which are obvious and inherent from the description of the apparatus itself.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A gate valve comprising a valve body having a valve chamber formed therein, flow passages formed in said valve body and intersecting said valve chamber, a valve gate member having planar sealing surfaces and being movably disposed within the valve chamber, said gate member having a through passage formed therein and being movable between an open position where said through passage is aligned with said flow passages and a closed position where said gate member blocks said flow passages, a pair of valve seats carried by the valve body and adapted to sealingly engage the planar sealing surfaces of the gate in annular areas surrounding the through passage, a valve guide member carried by said seating means, said guide member comprising a substantially planar guide body portion having a pair of vertically disposed guide flanges integral therewith and formed substantially normal thereto for restraining lateral movement of said gate, surfaces formed on each of said guide flanges for engagement with said valve seats for preventing movement of said guide member in one axial direction relative to said seat, a frusto-conical surface formed on each of said seat members, an angularly disposed tab member integral with said guide body portion and being in engagement with said frusto-conical surface to positively lock the lower portion of said guide member against movement in the other axial direction relative to said seat member, said angular tab also inhibiting movement between the upper portion of said guide member and the upper portion of said seat member.

2. A valve seat and valve guide unit for a gate valve having valve chamber with a plurality of seat recesses formed therein, and a gate member having planar sealing surfaces thereon, said unit comprising: an annular seat member adapted to be retained within each of said recesses, each of said seat members including a cylindrical seat ring portion having an annular flange portion thereon of larger diameter than the diameter of said recesses, and defining with said seat ring portion an annular sealing surface for engagement with a sealing surface of said gate, a frusto-conical surface formed on said flange remote from said sealing surface, a valve guide member comprising a planar body portion having a generally annular opening formed therein, the annular flange portion of said seat member disposed within said opening, a pair of valve guide flanges integral with said guide body portion and formed generally normal thereto, a generally planar surface on each of said guide flanges in engagement with the annular sealing surface of said seat member for preventing relative movement of the valve guide member and the seat member in one axial direction, means including said frusto-conical surface for preventing axial movement of the lower portion of the guide member in the other axial direction relative to the seat member.

3. A valve seat and valve guide unit for a gate valve having a valve chamber with a plurality of seat recesses formed therein, and a gate member having planar sealing surfaces thereon, said unit comprising: an annular seat member adapted to be retained within each of said recesses, each of said seat members including a cylindrical seat ring portion having an annular flange portion thereon of larger diameter than the diameter of said recesses, and defining with said seat ring portion an annular sealing surface for engagement with a sealing surface of said gate, a frusto-conical surface formed on said flange remote from said sealing surface, a valve guide member comprising a planar body portion having a generally annular opening formed therein, the annular flange portion of said seat member disposed within said opening, a pair of valve guide flanges integral with said guide body portion and formed generally normal thereto, a generally planar surface on each of said guide flanges in engagement with the annular sealing surface of said seat member for preventing relative movement of the valve guide member and the seat member in one axial direction, means including said frusto-conical surface for preventing axial movement of the lower portion of the guide member in the other axial direction relative to the seat member, an angular tab member formed integral with said guide body portion and in engagement with said frusto-conical surface to lock the lower portion of the guide member against movement relative to the seat member in the other axial direction and to inhibit movement between the upper portion of the guide member and the seat member to constrain them against movement therebetween.

4. A valve seat and valve guide unit for a gate valve having a valve body formed with a valve chamber and flow passages intersecting the valve chamber, seat recesses formed in the valve body within the valve chamber and about the flow passages, a gate member positioned for movement within the valve chamber and formed with substantially planar sealing surfaces, said unit comprising: an annular seat member having a cylindrical portion thereof adapted to be retained in each of said seat recesses, an annular flange portion integral with said cylindrical portion of said seat member and formed with a larger diameter than the diameter of said recess and defining with said cylindrical portion an annular sealing surface for engagement with the gate of said valve, a frusto-conical surface formed on said annular flange portion remote from said sealing surface, a valve guide member having a generally planar body portion having upper and lower surfaces and being formed with a generally annular central opening, the annular flange portion of said seat member being received within said opening, planar valve guide flanges formed integral with and substantially normal to said planar body portion, a seat support surface formed in each of said guide flanges below the lower surface of said body portion for engagement with the sealing surface of said seat member to prevent axial movement of the guide member in one direction relative to the seat member, means on said planar body portion of the guide member and engageable with said frusto-conical surface to limit axial movement of the lower portion of the guide member in the other direction.

5. A valve seat and valve guide unit for a gate valve having a valve body formed with a valve chamber and flow passages intersecting the valve chamber, seat recesses formed in the valve body within the valve chamber and about the flow passages, a gate member positioned for movement within the valve chamber and formed with substantially planar sealing surfaces, said unit comprising: an annular seat member having a cylindrical portion thereof adapted to be retained in each of said seat recesses, an annular flange portion integral with said cylindrical portion of said seat member and formed with a larger diameter than the diameter of said recess and defining with said cylindrical portion an annular sealing surface for engagement with the gate of said valve, a frusto-conical surface formed on said annular flange portion remote from said sealing surface, a valve guide member having a generally planar body portion having upper and lower surfaces and being formed with a generally annular central opening slightly larger than the diameter of said annular flange, the annular flange portion of said seat member being received within said opening, planar valve guide flanges formed integral with and substantially normal to said planar body portion, a seat support surface formed in each of said guide flanges below the lower surface of said body portion for engagement with the sealing surface of said seat member to prevent axial movement of the guide member in one direction relative to the seat member, a tab member integral with and angularly disposed in relation to said planar body portion of the guide member and engageable with said frusto-conical surface to limit axial movement of the lower portion of the guide member in the other direction.

6. A gate valve comprising a valve body having a valve chamber formed therein, flow passages formed in said valve body and intersecting said valve chamber, a valve gate member having planar sealing surfaces and movably disposed within said valve chamber, said gate member having a through passage formed therein and being movable between an open position where said through passage is aligned with said flow passages and a closed position where said gate blocks said flow passages, seat means carried by the valve body and adapted to sealingly engage the planar sealing surfaces of the gate in angular areas surrounding the through passage, each of said seat means having an annular flange formed thereon, valve guide means carried by said seating means, said guide means including a generally planar body portion having a generally annular opening therein, said annular opening receiving said flange of said seat means, said guide means having vertically disposed valve guide flanges for preventing excessive lateral movement of said gate, said guide flanges engaging said seat means for preventing movement of said guide member in one axial direction relative to said seat means, tab means on said planar body portion engaging said annular flange for preventing movement of the lower portion of said guide member in the other axial direction relative to said seat member.

7. A gate valve comprising a valve body having a valve chamber formed therein, flow passages formed in said valve body and intersecting said valve chamber, a valve gate member having planar sealing surfaces and movably disposed within said valve chamber, said gate member having a through passage formed thereon and being movable between an open position where said through passage is aligned with said flow passages and a closed position where said gate blocks said flow passages, seat means carried by the valve body and adapted to sealingly engage the planar sealing surfaces of the gate in annular areas surrounding the through passage, each of said seat means having an annular flange defining a frusto-conical surface, valve guide means carried by said seating means, said guide means including a generally planar body portion having a generally annular opening therein, said annular opening receiving said flange of said seat means, said guide means having vertically disposed valve guide flanges for preventing excessive lateral movement of said gate, surface means on said guide flanges engaging said seat means for preventing movement of said guide member in one axial direction relative to said seat means, retainer tab means on said valve guide means engaging said frusto-conical surface for preventing movement of the lower portion of said guide member in the other axial direction relative to said seat member and for inhibiting movement between the upper portion of said guide member and the upper portion of said seat member.

References Cited by the Examiner
UNITED STATES PATENTS
2,660,191 11/1953 Volpin _____ 251—327 X
2,796,230 6/1957 Grove et al. _____ 251—328 X

FOREIGN PATENTS
1,123,099 6/1956 France.
1,296,445 5/1962 France.

M. CARY NELSON, *Primary Examiner.*

A. ROSENTHAL, *Assistant Examiner.*